(12) United States Patent
Das et al.

(10) Patent No.: US 11,038,847 B1
(45) Date of Patent: Jun. 15, 2021

(54) FACILITATION OF SECURE COMMUNICATIONS BETWEEN A CLIENT AND COMPUTING INSTANCE

(71) Applicant: Amazon Technologies, Inc., Seattle, WA (US)

(72) Inventors: Munindra N. Das, Redmond, WA (US); Amjad Hussain, Bellevue, WA (US); Sivaprasad Venkata Padisetty, Bellevue, WA (US); Anantharam Vaidyanathan, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 319 days.

(21) Appl. No.: 16/000,070

(22) Filed: Jun. 5, 2018

(51) Int. Cl.
*H04L 29/06* (2006.01)

(52) U.S. Cl.
CPC ............ *H04L 63/029* (2013.01); *H04L 63/04* (2013.01); *H04L 63/0807* (2013.01); *H04L 63/0272* (2013.01)

(58) Field of Classification Search
CPC .... H04L 63/029; H04L 63/08; H04L 63/0428
See application file for complete search history.

(56) References Cited

U.S. PATENT DOCUMENTS

| | | | | |
|---|---|---|---|---|
| 6,986,061 B1* | 1/2006 | Kunzinger | .......... | H04L 63/0869 709/225 |
| 2008/0178278 A1* | 7/2008 | Grinstein | ............ | H04L 63/0227 726/12 |
| 2009/0106394 A1* | 4/2009 | Lin | ....................... | H04L 29/125 709/218 |

* cited by examiner

*Primary Examiner* — Dao Q Ho
(74) *Attorney, Agent, or Firm* — Lee & Hayes, P.C.

(57) ABSTRACT

This disclosure is directed to one or more computing services that provide users with secure access to a computing instance, which is auditable and accessible via a cross-platform browser-based shell or command-line interface (CLI). The computing service(s) forego any need to open up inbound ports, thereby improving security. The computing service(s) employ centralized authentication and auditing to ensure compliance with policies and to log activities for auditing, forensics, or other purposes. A message gateway service creates secure channels with a client device and the computing instance to establish a secure communication tunnel between the client device and computing instance. Once the tunnel is established, a user can send a command via the client device to the computing instance, via the message gateway service. The command output is uploaded to this tunnel and is sent back to the client device, via the message gateway service.

21 Claims, 12 Drawing Sheets

```
                                    ┌─ 300

┌─────────────────────────────────────────────────┐
│  RECEIVE A REQUEST FROM A CLIENT DEVICE TO      │
│  CREATE A FIRST SECURE CHANNEL BETWEEN THE      │
│  CLIENT DEVICE AND A MESSAGE GATEWAY            │
│  SERVICE 302                                    │
└─────────────────────────────────────────────────┘
                        │
                        ▼
┌─────────────────────────────────────────────────┐
│  AUTHORIZE THE CLIENT DEVICE IN RESPONSE TO     │
│  ANALYZING THE REQUEST USING AN ACCESS          │
│  MANAGER 304                                    │
└─────────────────────────────────────────────────┘
                        │
                        ▼
┌─────────────────────────────────────────────────┐
│  CREATE THE FIRST SECURE CHANNEL BETWEEN THE    │
│  CLIENT DEVICE AND A MESSAGE GATEWAY            │
│  SERVICE 306                                    │
└─────────────────────────────────────────────────┘
                        │
                        ▼
┌─────────────────────────────────────────────────┐
│  SEND A MESSAGE TO THE COMPUTING INSTANCE TO    │
│  OPEN A SECOND SECURE CHANNEL BETWEEN THE       │
│  MESSAGE GATEWAY SERVICE AND A COMPUTING        │
│  INSTANCE 308                                   │
└─────────────────────────────────────────────────┘
                        │
                        ▼
┌─────────────────────────────────────────────────┐
│  LOG CONTROL PLANE INFORMATION INCLUDING        │
│  CONNECTIVITY DETAILS 310                       │
└─────────────────────────────────────────────────┘
```

FIG. 3

FACILITATION OF SECURE COMMUNICATIONS BETWEEN A CLIENT AND COMPUTING INSTANCE

BACKGROUND

Many people access remote computing devices to perform computing tasks. Network-based computing is common and used by many people such as to access and execute applications, such as electronic mail applications, from remote client computers. However, there are constraints to this type of access depending on security policies and the types of network infrastructure and/or relationships between the computing devices used to exchange information.

People access computing instances, such as virtual servers or other distributed computing devices, in information technology environments through various different solutions or third-party virtual private network (VPN) solutions that are either not secure, add operational overhead, or not capable of automation. Administrators have to open inbound ports on instances leading to unauthorized access, manage secure shell (SSH) keys and certificates, and maintain bastion hosts or jump boxes. However, corporate security policies increasingly mandate increased user access control and auditable actions without enabling SSH or remote PowerShell access on instances.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

FIG. 3 is a flow diagram of an illustrative process to create a secure communication tunnel between a client device and a computing instance via the message gateway service.

DETAILED DESCRIPTION

Figure 1:
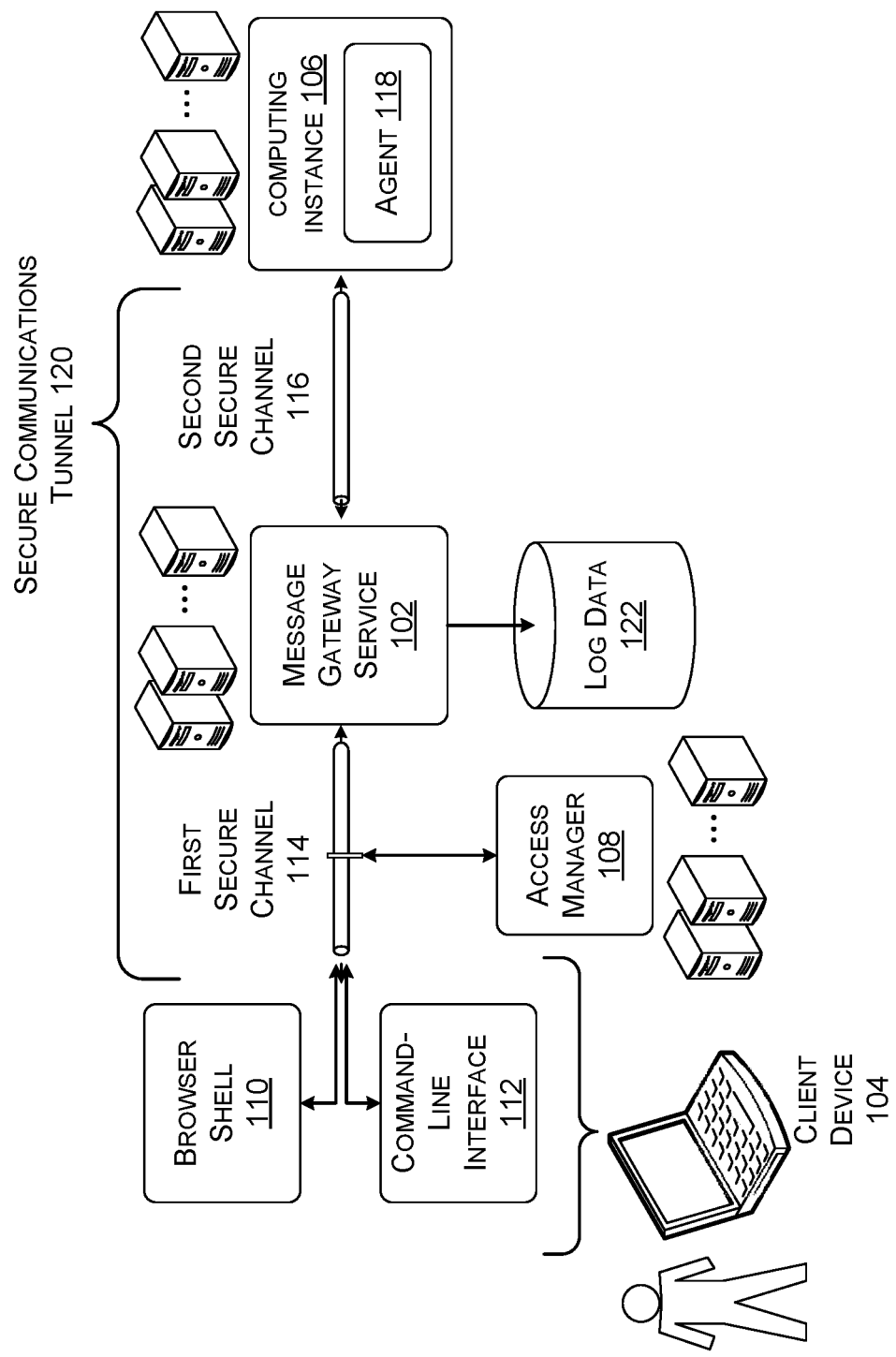
FIG. 1 is a block diagram of an illustrative environment that includes a message gateway service to facilitate secure communications between a client device and a computing instance.

This disclosure is directed to one or more computing services that provide users with a secure, access controlled, auditable and cross-platform browser-based shell and command-line interface (CLI) to manage a computing instance, such as a Windows instance, a Unix instance, and/or Linux instance, for trouble shooting and/or daily operational tasks. The computing service(s) include tools to allow administrators to create policies to control user access to instances, leverage best practices such as less-privileged access and encryption, and use application program interfaces (APIs) in standard and/or automation workflows. The computing service(s) can support interaction via a browser-based shell, such as with standard Unix bash and/or PowerShell capabilities from a services console. The computing service(s) forego any need to open up inbound ports, while having centralized authentication and auditing to ensure compliance with corporate policies. The computing service can use native computing services to centralize access control, track user access to instances, and log commands run on an instance.

The computing service(s) create a secure tunnel with a client device and also with a computing instance (e.g., target device that a user desires to control or send commands for execution). The computing service(s) authenticates the user and authorizes the request (instance access, API access) using defined policies, performs checks (such as verifying limits), and sends a message to an agent to open the new tunnel connection. Once the tunnel is established, a user can send a command via the client device, and the command output is uploaded to this tunnel and sent back to the client device.

The computing service(s) allow administrators to grant and revoke user access from a single location, track which users accessed instances, and what actions were performed. Meanwhile, the computing service(s) give developers and operators access to instances through a browser-based shell or CLI. The computing services are configured to allow administrators to deploy authentication services (e.g., identity and access management, etc.) to control or provide federated user access to machines and track machine access, possibly to create a dashboard of most or all human access to machines for auditing purposes. The computing service(s) may allow administrators to provide time-bound, non-root access to users to prevent less-privileged users from running commands such as "rm -rf", but may allow users to run less privileged operations such as checking port status or firewall settings, or parse application logs. Using the computing service(s), an on-call engineer investigating suspicious application latency on a production server simply logs into a console, chooses the server and if authorized, connects and performs diagnostics.

The computing service(s) provide a more secure computing environment then prior services by reducing an attack surface because there is no need to open up inbound secure shell or remote PowerShell ports, and provision or manage secure shell keys and certificates. Thus, computing instances can be managed in virtual private clouds with no public IPs.

In various embodiments, the computing service(s) may implement and enforce access privileges. For example, a message gateway service may reference privileges associated with a user account. When a command associated with the user account does not include a privilege to issue the command, then the message gateway service may refrain from sending the command to the computing instance. In some embodiments, the message gateway service may communicate with the client device via encrypted messages. The message gateway service may decrypt commands from the client device before sending the command to the computing instance. This may enable logging commands that are not encrypted. The message gateway service may encrypt the command before sending the command to the computing instance, possibly using different encryption keys than the keys used in association with the client device.

The techniques and systems described herein may be implemented in a number of ways. Example implementations are provided below with reference to the following figures.

FIG. 1 is a block diagram of an illustrative environment that includes a message gateway service 102 to facilitate secure communications between a client device 104 and a computing instance 106. The computing instance 106 may be a virtual machine, a remote machine, an instance of a machine that serves request from multiple devices, or any other type of computing configuration that responds to request from a client device and is configured to execute an operating system, such as Windows®, Linux®, Unix® or other operating systems. Meanwhile, the client device 104 may be any device with network connectivity that is configured to exchange communications with the computing instance 106 via the message gateway service 102. The devices may communicate by transmitting information using one or more networks, including wired and/or wireless networks.

The client device 104 may transmit messages to an access manager 108 and/or the message gateway service 102 using a browser shell 110 or a command line interface (CLI) 112. For example, the CLI 112 may enable users to input commands via command lines to send commands to the message gateway service 102 for execution by the computing instance 106. The browser shell 110 may provide a graphical user interface familiar with most users which may enable use of various input devices (e.g., cursor selection, dragging objects, etc.), and may enable immersive visual outputs. The browser shell 110 may replicate an environment provided by the computing instance, which is sometimes referred to as a remote desktop, which may look and feel like a local operating system, but is provided by a remote computing instance, such as the computing instance 106.

The message gateway service 102 may enable the client device 104 to connect with and exchange information with the computing instance by creating and facilitating use of a secure communications tunnel between the client device 104 and the computing instance 106. In contrast to typical secure shell (SSL) configurations that require an open connection initiated by the computing instance 106, the message gateway service 102 may initiate the open connection with the computing instance 106 in response to a request from the client device 104 that is authenticated and has proper privileges to access the computing instance 106.

To initiate a connection with the computing instance 106, the client device 104 may interact with the access manager 108 for authentication purposes. The access manager 108 may determine an identity of the user of the client device 104, and may determine access privileges, possibly via a user account associated with the user. The access manager 108 may enable an administrator or person or entity to grant and revoke access control to instance(s) from one place. The access manager 108 may provide non-root access to specific users.

Once authenticated and granted permission via privileges, the message gateway service 102 may establish a first secure channel 114 with the client device 104. In some embodiments, the message gateway service 102 may exchange encryption keys to enable encryption of data transmitted between the client device 104 and the message gateway service 102.

The message gateway service 102 may open a connection with the computing instance to create a second secure channel 116 between the message gateway service 102 and the computing instance 106. The message gateway service 102 may interact with an agent 118 of the computing instance 106 to exchange information to establish the second secure channel 116. In various embodiments, the message gateway service 102 may exchange encryption keys to enable encryption of data transmitted between the computing instance 106 and the message gateway service 102. The first secure channel 114 and the second secure channel 116 may form a secure communication tunnel 120, which enable communications between the client device 104 and the computing instance 106 via the message gateway service 102.

During use of the secure communication tunnel 120, the message gateway service 102 may generate at least some log data 122. The message gateway service 102 may store commands from the client device 104 and/or outputs/responses from the computing instance 106 as the log data 122. In addition, other metadata may be stored as log data, such as time stamps, error messages, event codes, and other types of metadata associated with logs in the log data 122. The log data may be generated by leveraging other services that log information and/or events, such as CloudTrail®, to track machine access, for example. Some data may not be logged, such as passwords and other sensitive information. Log data may be used for audits, forensics, and/or other uses.

Figure 2:
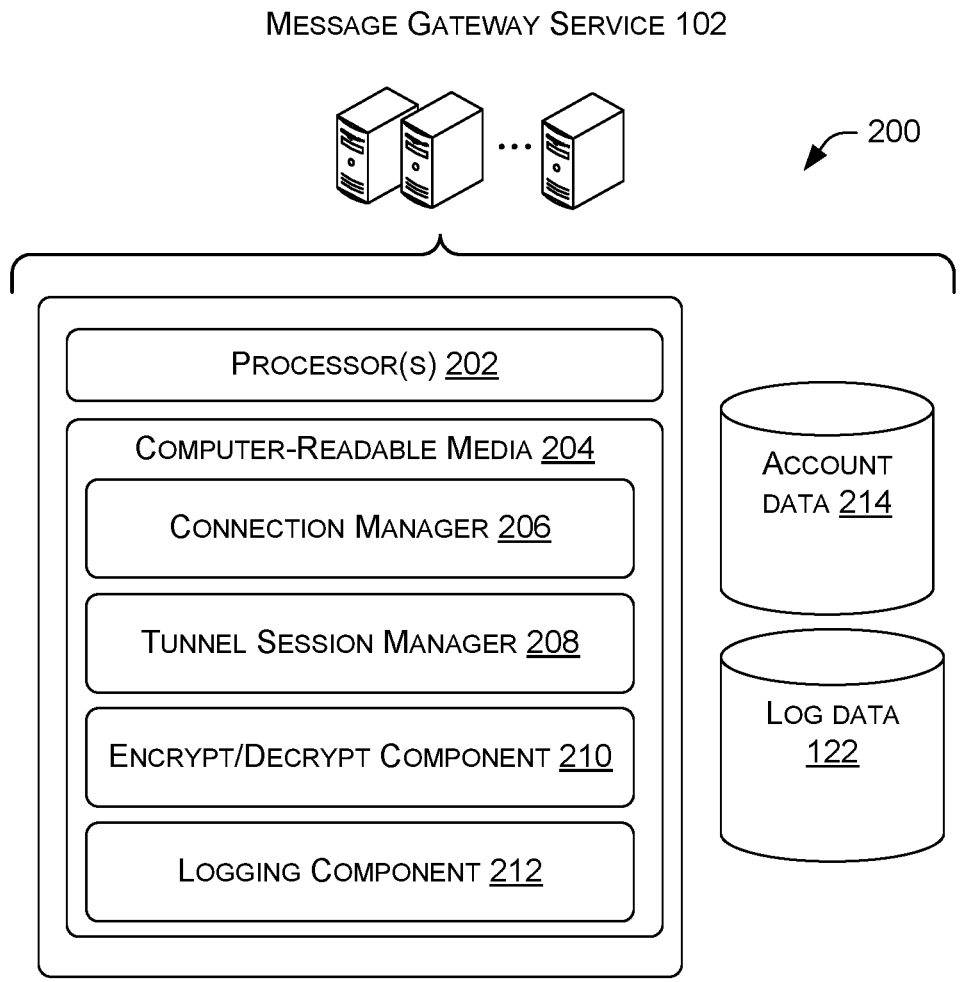
FIG. 2 is a block diagram of an illustrative computing architecture of the message gateway service shown in FIG. 1.

FIG. 2 is a block diagram of an illustrative computing architecture 200 of the message gateway service shown in FIG. 1. The computing architecture 200 may be implemented in a distributed or non-distributed computing environment.

The computing architecture 200 may include one or more processors 202 and one or more computer readable media 204 that stores various modules, applications, programs, or other data. The computer-readable media 204 may include instructions that, when executed by the one or more processors 202, cause the processors to perform the operations described herein for the message gateway service 102.

Embodiments may be provided as a computer program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of media/ machine-readable medium suitable for storing electronic instructions. Further, embodiments may also be provided as a computer program product including a transitory machine-readable signal (in compressed or uncompressed form). Examples of machine-readable signals, whether modulated using a carrier or not, include, but are not limited to, signals that a computer system or machine hosting or running a computer program can be configured to access, including signals downloaded through the Internet or other networks.

In some embodiments, the computer-readable media 204 may store a connection manager 206, a tunnel session manager 208, an encrypt/decrypt component 210, and a logging component 212, which are described in turn. The components may be stored together or in a distributed arrangement. The computing architecture may include or have access to account data 214 and the log data 122.

The connection manager 206 may perform authentication of a user of the client device 104, and may establish the first secure channel 114 and the second secure channel 116 in response to successful authentication and privileges. In some embodiments, the connection manager 206 may interact with the access manager 108 to perform authentication of a user. The connection manager 206 may access account data 214, which may include privileges associated with the user and possibly other user data. For example, users may sign up for or subscribe to a service, which may include specific privileges for different users. Administrators or other algorithms or humans may specify user privileges for association with users in the account data 214. The privileges may include resources accessibly, types of commands that can or cannot be used by a user, and/or other types of permission and controls.

The connection manager 206 may create or open the first secure channel 114 in response to authentication of the user of the client device 104. The first secure channel 114 may provide secure communications (possibly encrypted) between the client device 104 and the message gateway service 102. The first secure channel 114 may include at least an open web-socket connection with a uniform resource locator (URL), a channel token, and a session identifier. After the first secure channel 114 is created or opened, the connection manager 206 may initiate creating or opening of the second secure channel 116 between the message gateway service 102 and the computing instance 106. The connection manager 206 may initiate the connection via the agent 118, which may be under control of the computing instance 106 or may be associated with the computing instance 106 and other computing instances (e.g., a centralized agent).

The tunnel session manager 208 may manage use of the secure communications tunnel 120 formed by the first secure channel 114 and the second secure channel 116, which enable exchange of communications between the client device 104 and the computing instance 106. In some embodiments, the tunnel session manager 208 may enforce timeout policies. The tunnel session manager 208 may enforce privileges by refraining from passing a command from the client device 104 to the computing instance 106 when the user does not have a respective privilege to execute the command or access the computing resource. Of course, at least some privilege enforcement may be managed by the computing instance 106.

The encrypt/decrypt component 210 may facilitate exchange of keys (e.g., public/private keys) for encryption/ decryption of data transmitted between devices. In some embodiments, communications between the client device 104 and the message gateway service 102 may be encrypted using a first encryption scheme. In various embodiments, communications between the message gateway service 102 and the computing instance 106 may be encrypted using a second encryption scheme.

The logging component 212 may capture and store at least some data in the log data 122. The logging component 212 may store commands from the client device and/or outputs/ responses from the computing instance 106. In some embodiments, the logging component 212 may store metadata that includes, for example, associations between commands and outputs, timestamps, error messages, and/or other information associated with commands and/or outputs. The logging component 212 may be performed at least in part by other services and/or may leverage other services, such as CloudTrail® to track machine access. In various embodiments, the logging component 212 and/or the connection manager 206 may store control plane information associated with client connectivity (e.g., connectivity of the client device 104 with the message gateway service 102 and/or the computing instance 106).

FIGS. 3-7 are flow diagrams of illustrative processes illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

FIG. 3 is a flow diagram of an illustrative process 300 to create a secure communication tunnel between a client device and a computing instance via the message gateway service. The process 300 is described with reference to the environment 100 and the computing architecture 200 and may be performed by the message gateway service. Of course, the process 300 may be performed in other similar and/or different environments.

At 302, the message gateway service 102 may receive a request from a client device to create or open a first secure channel between the client device and a message gateway service 102. In some embodiments, the request may be received by the access manager 108. The access manager 108 may authenticate the user and/or pass information to the message gateway service 102.

At 304, the message gateway service 102 and/or the access manager 108 may authorize the client device in response to analyzing the request. For example, the access manager 108 may authenticate the user of a client device, and transmit authentication information to the message gateway service 102 to initiate creating or opening the first secure channel.

At 306, the message gateway service 102 may create or open the first secure channel between the client device and a message gateway service. The first secure channel may include at least an open web-socket connection with a uniform resource locator (URL), a channel token, and a session identifier. In some embodiments, the connection manager 206 may receive the request and initiate opening of the first secure channel. The connection manager 206 may transmit a channel token and a session identifier to the client device to establish the first secure channel.

At 308, the message gateway service 102 may send a message to an agent of the computing instance to open a second secure channel between the message gateway service and a machine instance, wherein the first secure channel and the second secure channel form the secure communication tunnel. The second secure channel may include at least a channel token and a session identifier. In some embodiments, the connection manager 206 may receive the request and initiate opening of the second secure channel. The connection manager 206 may transmit at least a channel token and a session identifier to the computing instance to establish the second secure channel.

At 310, the message gateway service and/or the logging component may store control plane information associated with connectivity of the client device with the message gateway service 102 and/or ultimately with the computing instance 106. For example, the connection manager 206 and/or the logging component 212 may store information associated with connection of the client device 104 with the message gateway service 102 and/or the computing instance 106 in the log data 122 or another storage location. The information may include a time of the connection (e.g., begin, end, duration, etc.), a user identifier, a client device identifier, and/or other connectivity details associated with control of the computing instance via the client device.

Figure 4:
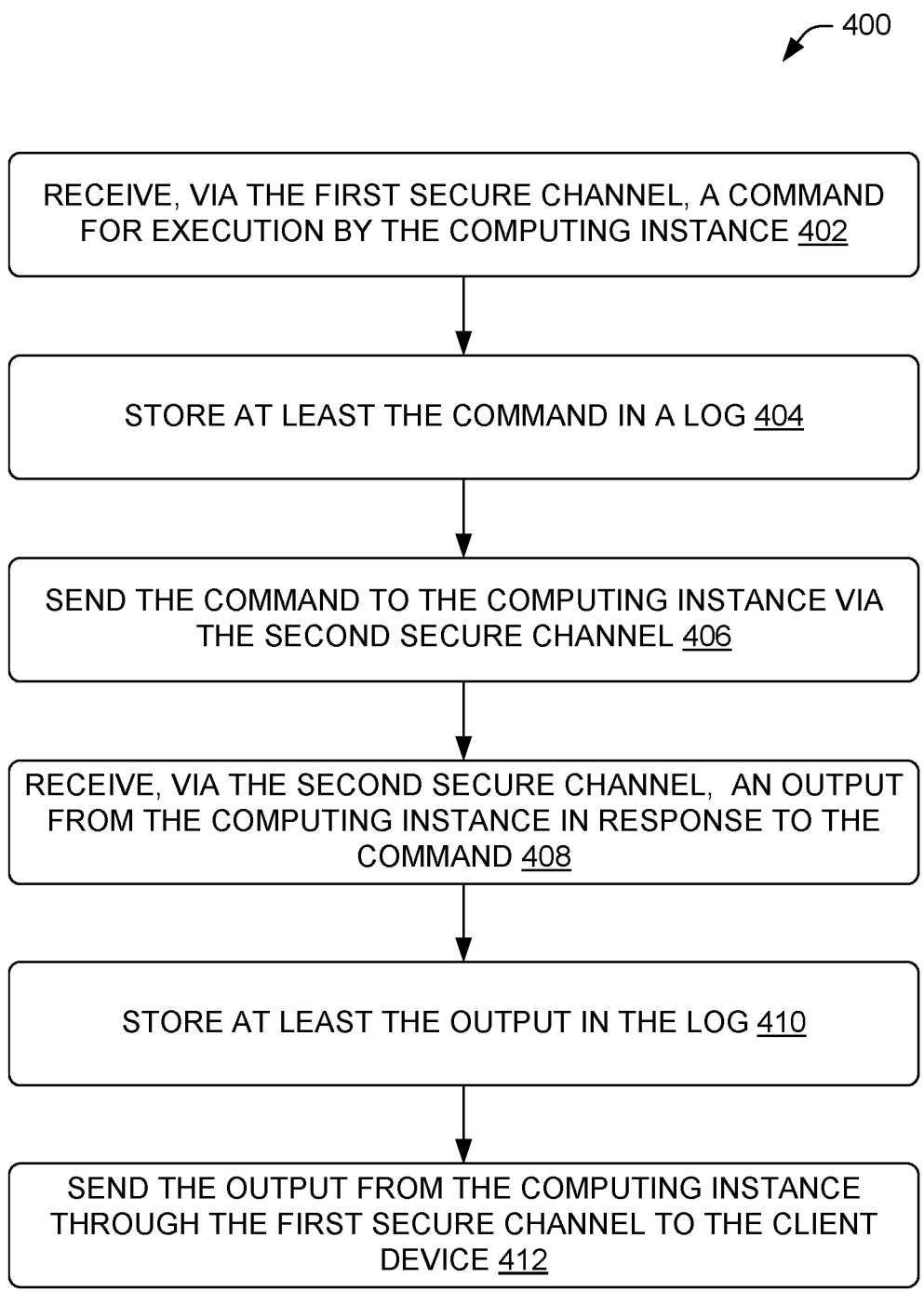
FIG. 4 is a flow diagram of an illustrative process to facilitate exchange of commands, outputs, and logging via the message gateway service during use of a secure communication tunnel between the client device and the computing instance.

FIG. 4 is a flow diagram of an illustrative process 400 to facilitate exchange of commands, outputs, and logging via the message gateway service during use of a secure communication tunnel between the client device and the computing instance. The process 400 is described with reference to the environment 100 and the computing architecture 200 and may be performed by the message gateway service. Of course, the process 400 may be performed in other similar and/or different environments.

At 402, the message gateway service 102 may receive, via the first secure channel, a command for execution by the machine instance. For example, a user of the client device 104 may transmit the command via the CLI or the browser shell for receipt by the message gateway service 102. The command may be a text based command, an action (e.g., manipulation of an object in a user interface, etc.), a file (e.g., an image, an audio file, etc.), and/or other data that provides instructions or actions when received by the computing instance 106.

At 404, the message gateway service 102 may store at least the command in a log. For example, the logging component 212 may store the command in the log data 122. In some embodiments, the logging component 212 may also store metadata associated with the command in the log data 122, such as a time stamp or other information.

At 406, the message gateway service 102 may send the command to the computing instance via the second secure channel. For example, the tunnel session manager 208 may facilitate transport of the command from the message gateway service 102 to the computing instance 106.

At 408, the message gateway service 102 may receive, via the second secure channel, an output from the computing instance in response to the command. The output may be a message, result, response, and/or other data generated by the computing instance, possibly in response to the command.

At 410, the message gateway service 102 may store at least the output in the log. For example, the logging component 212 may store the output in the log data 122. In some embodiments, the logging component 212 may also store metadata associated with the output in the log data 122, such as a time stamp, a link to a command associated with the output, and/or other information.

At 412, the message gateway service 102 may send the output from the computing instance through the first secure channel to the client device. For example, the tunnel session manager 208 may facilitate transport of the output from the message gateway service 102 to the client device 104.

Figure 5:
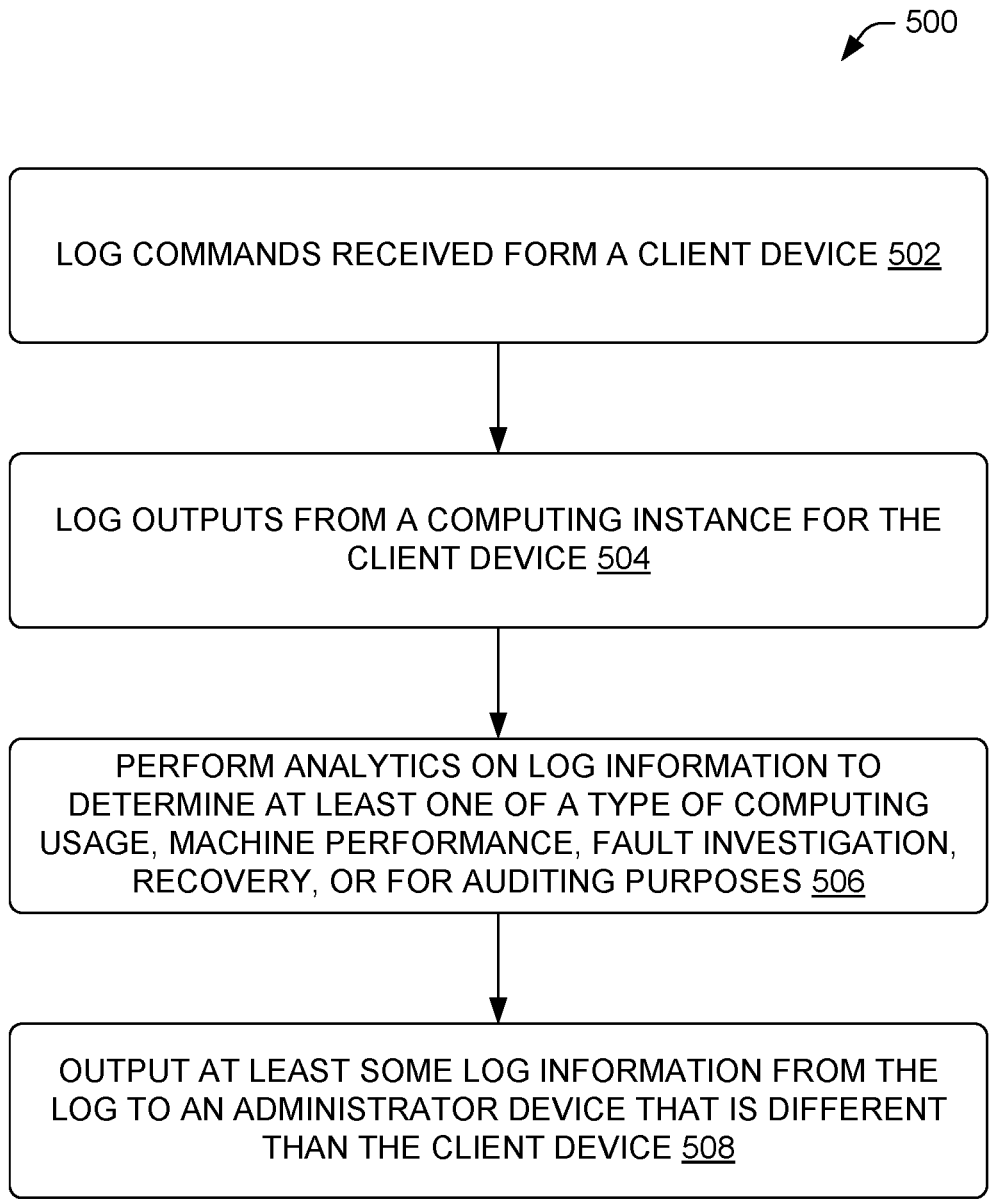
FIG. 5 is a flow diagram of an illustrative process to create log information and send at least some log information to a different device.

FIG. 5 is a flow diagram of an illustrative process 500 to process log information and send at least some log information to a different device. The process 500 is described with reference to the environment 100 and the computing architecture 200 and may be performed by the message gateway service. Of course, the process 500 may be performed in other similar and/or different environments.

At 502, the message gateway service 102 may log commands received form a client device. For example, the logging component 212 may store commands in the log data 122. In some embodiments, the logging component 212 may also store metadata associated with the commands in the log data 122, such as a time stamp or other information. In various embodiments, other applications and/or services may be used to capture log data from the commands, monitor system response, and/or provide log information to the log data 122.

At 504, the message gateway service 102 may log outputs from a computing instance for the client device. For example, the logging component 212 may store the outputs in the log data 122. In some embodiments, the logging component 212 may also store metadata associated with the outputs in the log data 122, such as a time stamp, a link to a command associated with the output, and/or other information. In various embodiments, other applications and/or services may be used to capture log data from the outputs, monitor system response, and/or provide log information to the log data 122.

In some embodiments, the log data may be encrypted. The encryption may be the same as an encryption used to transport the data from the client device and/or from the computing instance. In this situation, the keys may be held by those respective devices. In various embodiments, the log data may be encrypted with different keys, possibly to enable simplified retrieval by authorized parties (e.g., an administrator).

At 506, the message gateway service 102 may perform analytics on the log information stored in the log data 122. In some embodiments, the logging component 212 may generate the analytics based on requests, such as human request, machine request, and/or using standard or scheduled reporting requests, among other possible types of requests. The analytics may be used to determine at least one of a type of computing usage, machine performance, fault investigation, recovery, and/or may be used for auditing purposes and/or forensics purposes. In some embodiments, an administrator may create criteria for the analysis, such as to generate outputs when users request commands that they do not have a privilege to execute, when and by whom certain computing resources are requested, and so forth.

At 508, the message gateway service 102 may output at least some log information from the log to an administrator device. The administrator device may be a device that is different than the client device and the computing instance. The logging component 212 may provide the log information, such as in response to a request or query of the log data 122.

Figure 6:
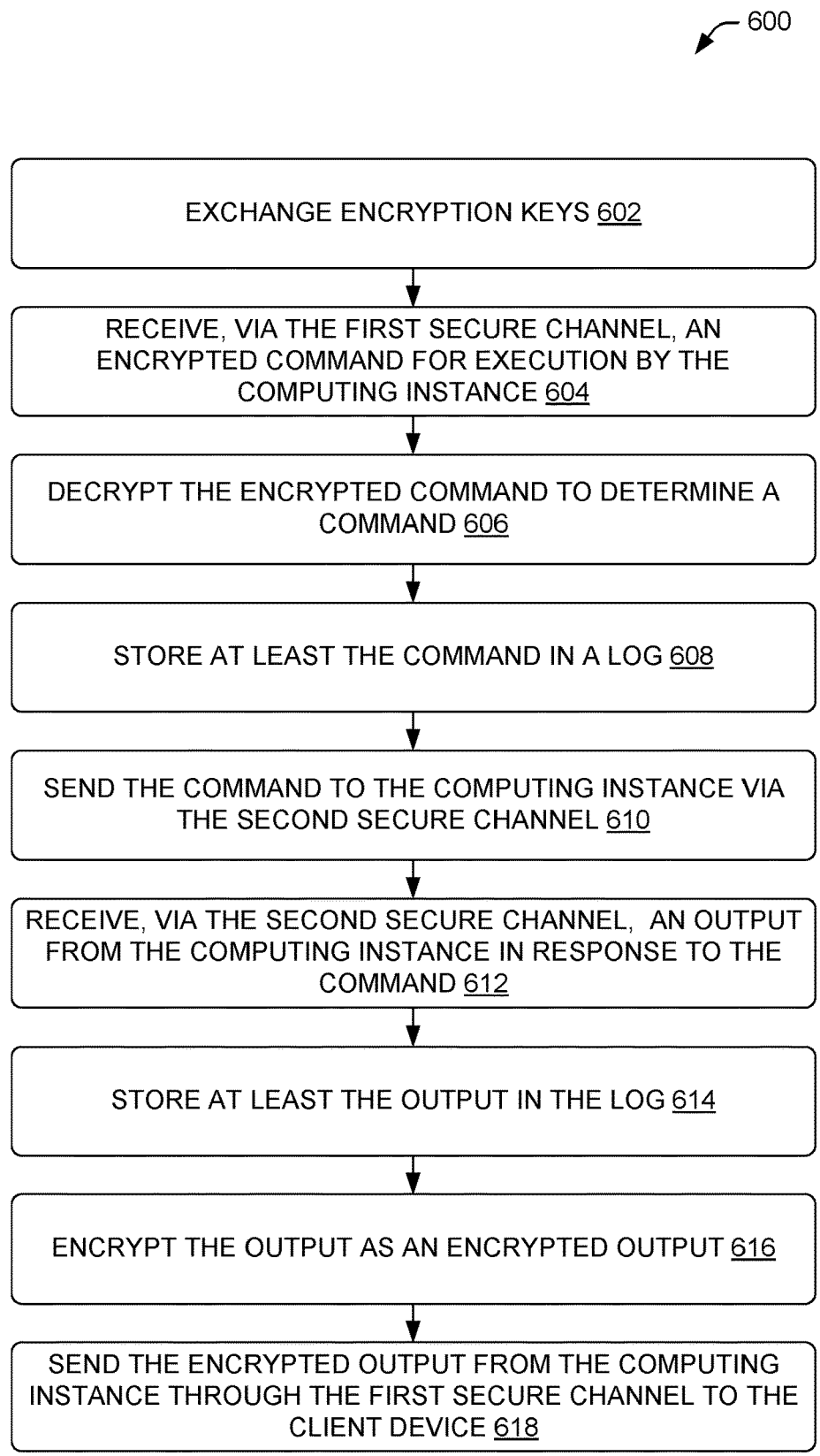
FIG. 6 is a flow diagram of an illustrative process to perform encryption and decryption via the message gateway service at least with communications exchanged with the client device.

FIG. 6 is a flow diagram of an illustrative process 600 to perform encryption and decryption via the message gateway service at least with communications exchanged with the client device. The process 600 is described with reference to the environment 100 and the computing architecture 200 and may be performed by the message gateway service. Of course, the process 600 may be performed in other similar and/or different environments.

At 602, the message gateway service 102 may exchange encryption keys with the client device, such as private/public keys to enable encryption/decryption of data transmitted between the client device 104 and the message gateway service 102.

At 604, the message gateway service 102 may receive, via the first secure channel, an encrypted command for execution by the machine instance. For example, a user of the client device 104 may transmit the encrypted command via the CLI or the browser shell for receipt by the message gateway service 102. The encrypted command may be a text based command, an action (e.g., manipulation of an object in a user interface, etc.), a file (e.g., an image, an audio file, etc.), and/or other data that provides instructions or actions when received by the computing instance 106, which is encrypted using the keys exchanged from the operation 602.

At 606, the message gateway service 102 may decrypt the encrypted command to determine a command. For example, the encrypt/decrypt component 210 may decrypt the command using the keys exchanged from the operation 602.

At 608, the message gateway service 102 may store at least the command in a log. For example, the logging component 212 may store the command in the log data 122. In some embodiments, the logging component 212 may also store metadata associated with the command in the log data 122, such as a time stamp or other information.

At 610, the message gateway service 102 may send the command to the computing instance via the second secure channel. For example, the tunnel session manager 208 may facilitate transport of the command from the message gateway service 102 to the computing instance 106.

At 612, the message gateway service 102 may receive, via the second secure channel, an output from the computing instance in response to the command. The output may be a message, result, response, and/or other data generated by the computing instance, possibly in response to the command.

At 614, the message gateway service 102 may store at least the output in the log. For example, the logging component 212 may store the output in the log data 122. In some embodiments, the logging component 212 may also store metadata associated with the output in the log data 122, such as a time stamp, a link to a command associated with the output, and/or other information.

At 616, the message gateway service 102 may encrypt the output as an encrypted output. For example, the encrypt/decrypt component 210 may encrypt the output using the keys exchanged from the operation 602.

At 618, the message gateway service 102 may send the encrypted output from the computing instance through the first secure channel to the client device. For example, the tunnel session manager 208 may facilitate transport of the encrypted output from the message gateway service 102 to the client device 104.

In some embodiments, the message gateway service 102 may perform similar operations to exchange keys with the computing instance to enable encryption of messaged between the message gateway service 102 and the computing instance 106. In still further embodiments, the message gateway service 102 may facilitate encryption across the secure communications tunnel, such as by facilitating exchange of keys with the client device and the computing instance.

Figure 7:
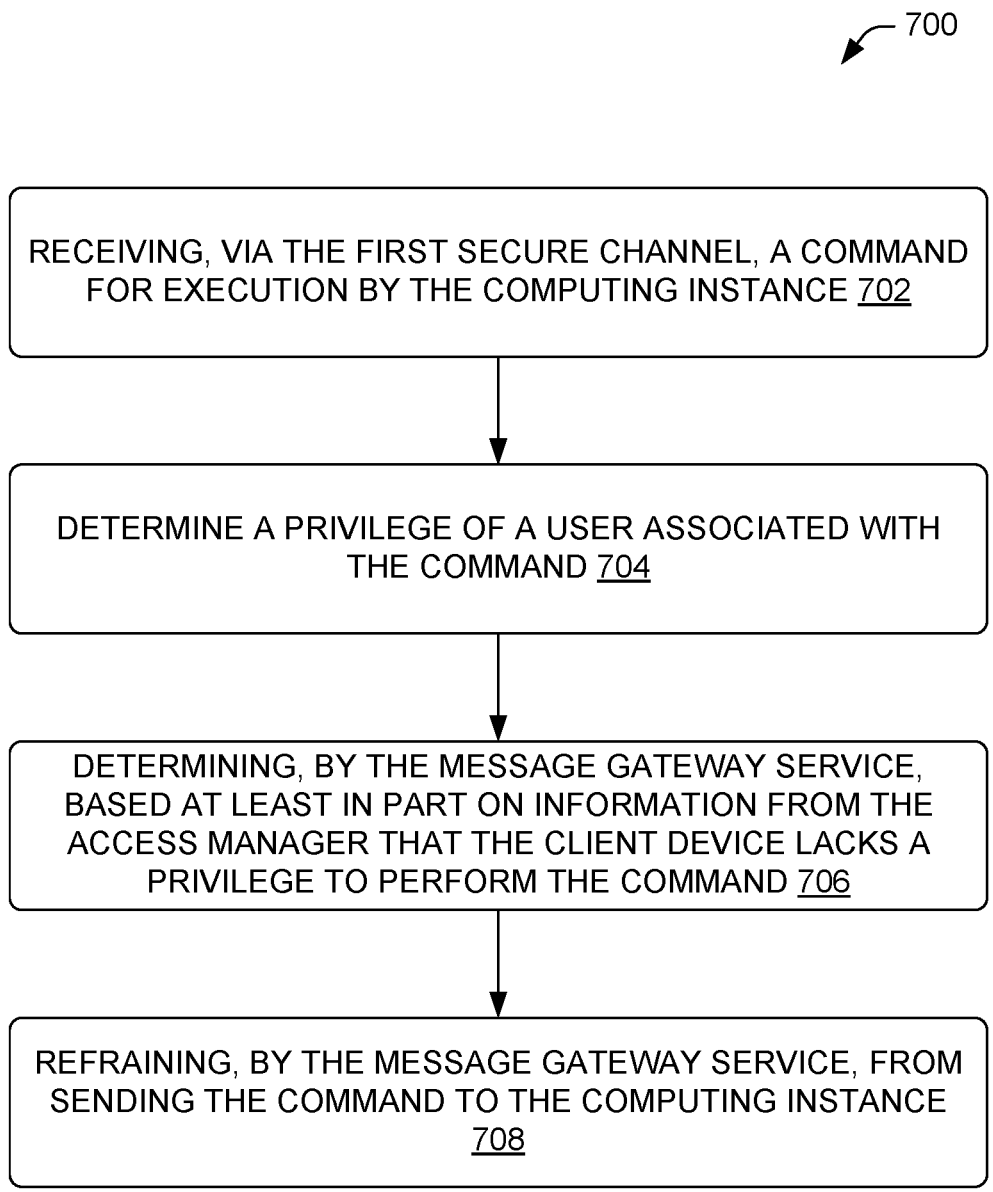
FIG. 7 is a flow diagram of an illustrative process to enforce privileges by the message gateway service for commands issued by the client device.

FIG. 7 is a flow diagram of an illustrative process 700 to enforce privileges by the message gateway service for commands issued by the client device. The process 700 is described with reference to the environment 100 and the computing architecture 200 and may be performed by the message gateway service. Of course, the process 700 may be performed in other similar and/or different environments.

At 702, the message gateway service 102 may receive, via the first secure channel, a command for execution by the computing instance. For example, the command may be a request for access to a computing resource or to perform a particular operation, such as modify a file or setting.

At 704, the message gateway service 102 may determine a privilege of a user associated with the command. For example, the connection manager 206 may determine privileges of the user of the client device 104 that sent the command. The privileges may be stored in the account data 214.

At 706, the message gateway service 102 may determine, possibly based at least in part on information from the access manager, that the client device lacks a privilege to perform the command. For example, the tunnel session manager 208 may identify the command as in violation of a privilege or that the user does not have a privilege to issue the command.

At 708, the message gateway service 102 may refrain from sending the command to the computing instance. For example, the tunnel session manager 208 may refrain from sending the command to the computing instance 106. In some embodiments, the tunnel session manager 208 may transmit a reason message to the client device in response to refraining from sending the command to the computing instance 106, such as to provide a reason code or other helpful information to the user. Although some privileges may be enforced by the message gateway service 102, the computing instance may enforce the same privileges or other privileges depending on the configuration of the system.

Figure 8:
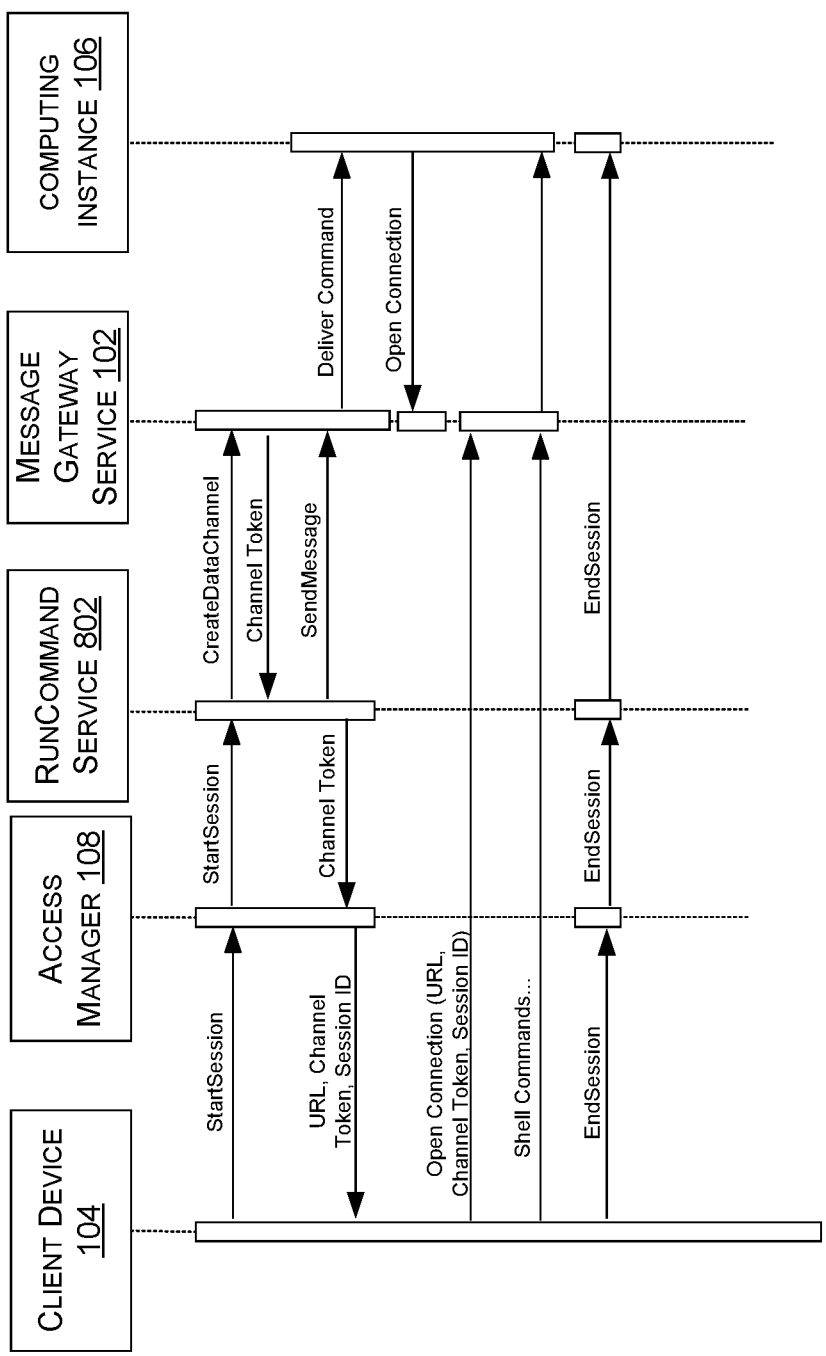
FIG. 8 is a sequence flow diagram showing communications between different devices and/or components, including the message gateway service.

FIG. 8 is a sequence flow diagram 800 showing illustrative communications between different devices and/or components, including the message gateway service 102.

A user of the client device 104 may use the CLI or browser shell to send a request to start a session. A StartSession API may be made to a RunCommand Service 802, possibly using a user's identity (e.g., username, credentials, etc.). The access manager 108 may validate access permission, via authentication. After access validation, the RunCommand service 802 may send the message gateway service 102 a notification about the session request, such as by using a CreateDataChannel call.

The message gateway service 102 may record this invocation and may responds back with a token to connect to the first secure channel for this invocation.

The RunCommand service 802 may use the existing SendMessage mechanism through the message gateway service 102 to deliver the request to the computing instance 106, possibly via an Agent associated with the computing instance. The computing instance (or the agent) may start the local shell and open a WebSocket connection back to the message gateway service 102 for Input/Output data. This may create the second secure channel.

The client device, via the CLI or browser shell, may also open up a WebSocket connection to MGS, which may create the first secure channel.

The message gateway service 102 may internally initiate the first secure channel from the client device 104 to the second secure channel from the computing instance (or agent) to create the secure communications tunnel. The secure communications tunnel may then be ready for use to allow the user, via the client device 104 to interact with the computing instance 106 via the intermediary message gateway service 102. The user can use the secure communications tunnel to send commands and view output similar to a secure shell (SSH) environment.

The secure communications tunnel can be terminated by a request. For example, the request may be an input of "exit" inside the CLI or browser shell. In some embodiments, the secure communications tunnel may timeout due to inactivity or due to violations of use (e.g., attempts to violate privileges, detection of malware, etc.).

Figure 9:
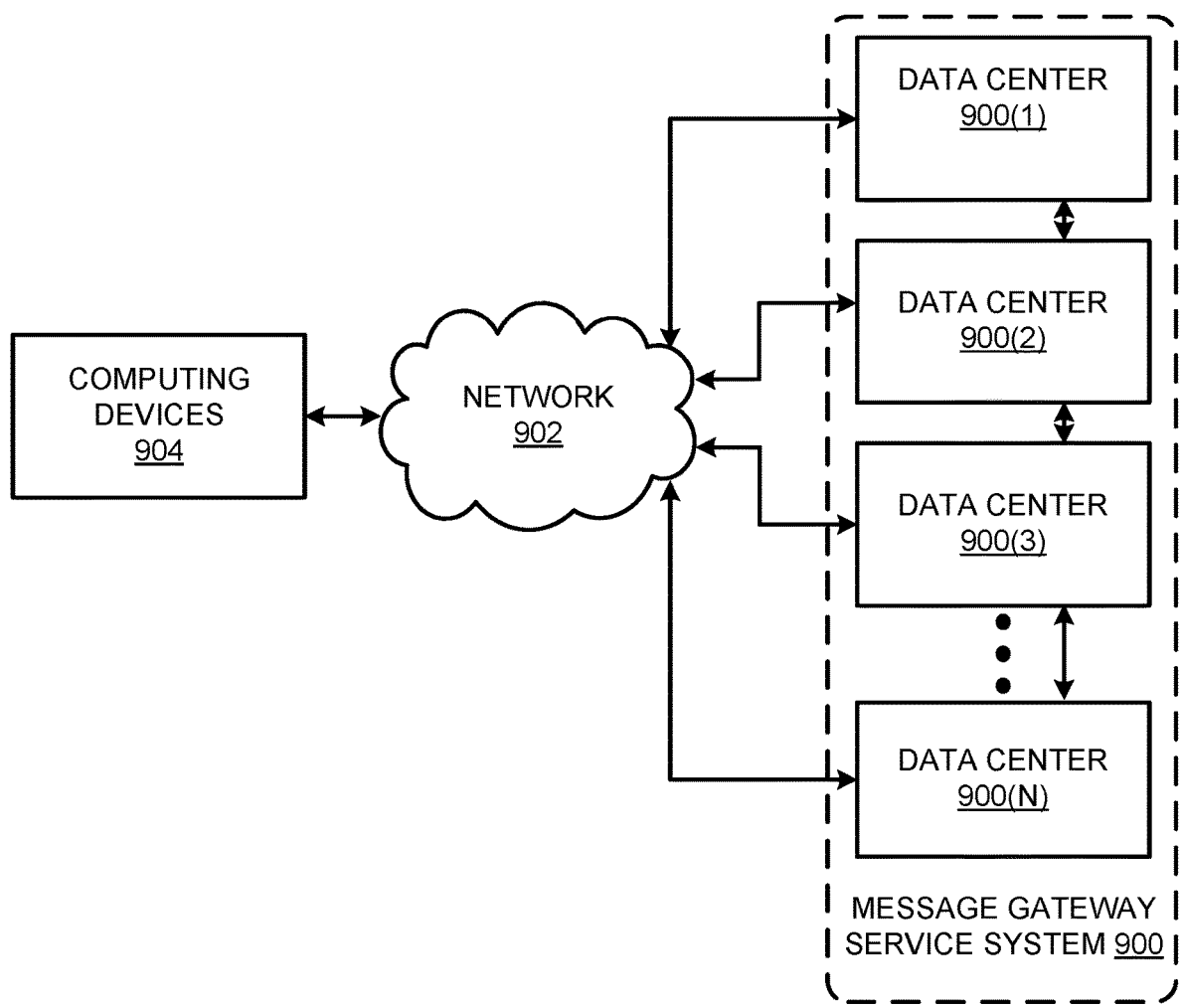
FIG. 9 is a system and network diagram that shows an illustrative operating environment that includes a system that can be configured to implement aspects of the functionality described herein.

FIG. 9 is a system and network diagram that shows an illustrative operating environment that includes a message gateway service system 900 that can be configured to implement aspects of the functionality described herein. As discussed briefly above, the system can execute network services, such as the data storage and data streaming, and/or provide computing resources, such as for the concentrator, on a permanent or an as-needed basis. Among other types of functionality, the computing resources provided by the system, or by a larger system of which the system is a part, can be utilized to implement the various network services described herein. As also discussed above, the system may be part of a larger system that provides the additional computing resources that include, without limitation, data storage resources, data processing resources, such as virtual machine (VM) instances, networking resources, data communication resources, network services, and other types of resources.

Each type of computing resource provided by system, or by a larger system of which the system is a part, can be general-purpose or can be available in a number of specific configurations. For example, data processing resources can be available as physical computers or VM instances in a number of different configurations. The VM instances can be configured to execute applications, including web servers, application servers, media servers, database servers, some or all of the network services described above, and/or other types of programs. Data storage resources can include file storage devices, block storage devices, and the like. The system, or a larger system of which the system is a part, can also be configured to provide other types of computing resources not mentioned specifically herein.

The computing resources provided by system, or a larger system of which the system is a part, are enabled in one implementation by one or more data centers 900(1), 900(2), 900(3), . . . , 900(N). The data centers are facilities utilized to house and operate computer systems and associated components. The data centers typically include redundant and backup power, communications, cooling, and security systems. The data centers can also be located in geographically disparate locations. One illustrative configuration for a data center that can be utilized to implement the technologies disclosed herein will be described below with regard to FIG. 10.

The users of the system can access the computing resources, such as message gateway service 102, provided by the system over a network 902, which can be a wide area communication network ("WAN"), such as the Internet, an intranet or an Internet service provider ("ISP") network or a combination of such networks. For example, and without limitation, a computing device 904 (e.g., the computing device 104) operated by a user of the system can be utilized to access the system by way of the network 902. It should be appreciated that a local-area network ("LAN"), the Internet, or any other networking topology known in the art that connects the data centers to remote users and other users can be utilized. It should also be appreciated that combinations of such networks can also be utilized.

Figure 10:
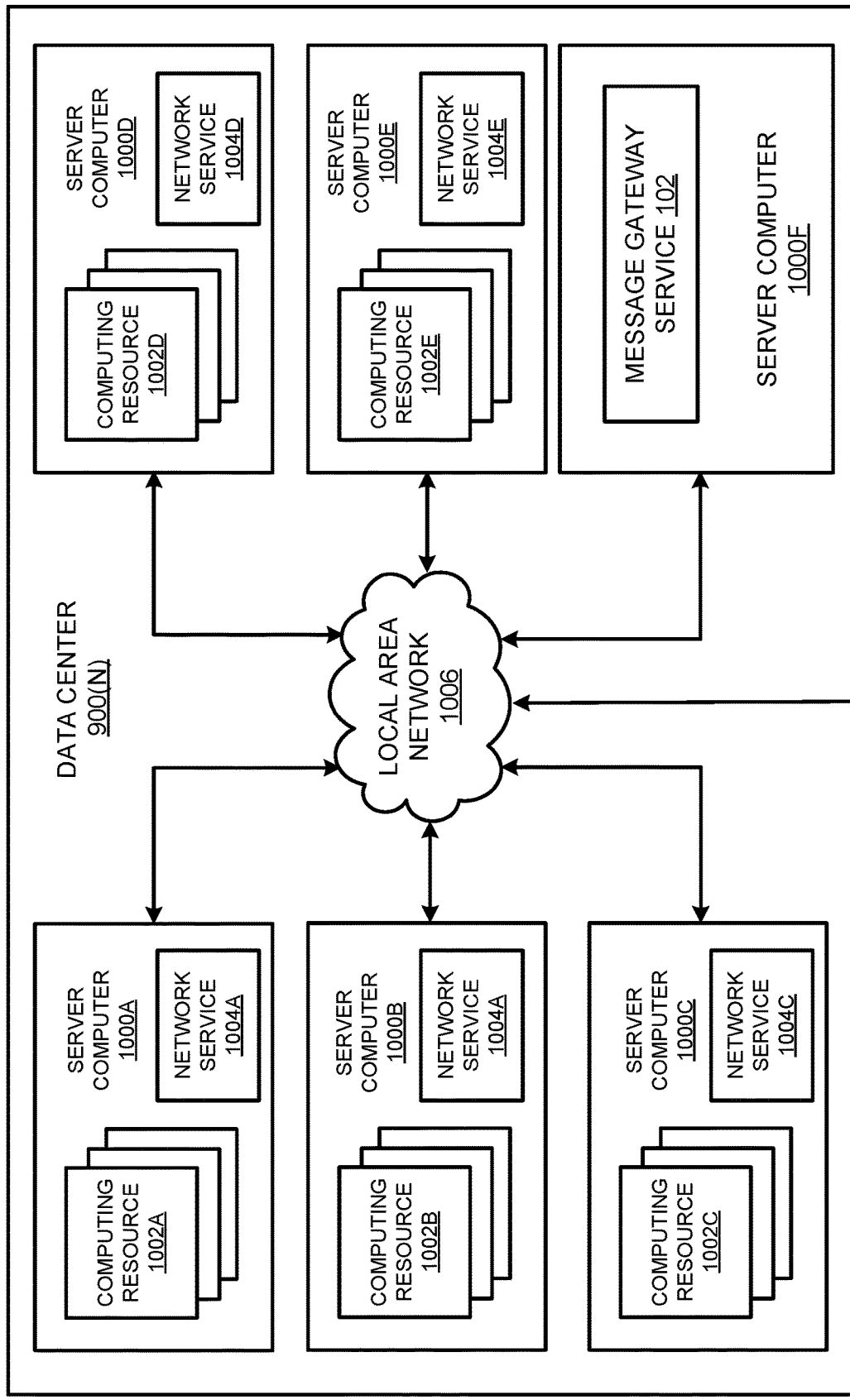
FIG. 10 is a computing system diagram illustrating a configuration for a data center that can be utilized to implement aspects of the technologies disclosed herein.

FIG. 10 is a computing system diagram that illustrates one configuration for a data center 900(N) that can be utilized to implement the message gateway service 102 as described above in FIGS. 1-8, and/or any other network services disclosed herein, such as the computing instance 106 and/or the access manager 108. The example data center 900(N) shown in FIG. 10 includes several server computers 1000A-1000E (collectively 1000) for providing the computing resources 1002A-1002E (collectively 1002), respectively.

The server computers 1000 can be standard tower, rack-mount, or blade server computers configured appropriately for providing the various computing resources described herein (illustrated in FIG. 10 as the computing resources 1002A-1002E). As mentioned above, the computing resources 1002 provided by the system, or a larger system of which the system is a part, can include, without limitation, analytics applications, data storage resources, data processing resources such as VM instances or hardware computing systems, database resources, networking resources, and others. Some of the servers 1000 can also be configured to execute network services 1004A-1004E (collectively 1004) capable of instantiating, providing and/or managing the computing resources 1002, some of which are described in detail herein.

The data center 900(N) shown in FIG. 10 also includes a server computer 1000F that can execute some or all of the software components described above. For example, and without limitation, the server computer 1000F can be configured to execute the message gateway service 102. The server computer 1000F can also be configured to execute other components and/or to store data for providing some or all of the functionality described herein. In this regard, it should be appreciated that components or different instances of the message gateway service 102 can execute on many other physical or virtual servers in the data centers 800 in various configurations.

In the example data center 900(N) shown in FIG. 10, an appropriate LAN 1006 is also utilized to interconnect the server computers 1000A-1000F. The LAN 1006 is also connected to the network 902 illustrated in FIG. 9. It should be appreciated that the configuration of the network topology described herein has been greatly simplified and that many more computing systems, software components, networks, and networking devices can be utilized to interconnect the various computing systems disclosed herein and to provide the functionality described above.

Appropriate load balancing devices or other types of network infrastructure components can also be utilized for balancing a load between each of the data centers 900(1)-(N), between each of the server computers 1000A-1000F in each data center 900, and, potentially, between computing resources 1002 in each of the data centers 900. It should be appreciated that the configuration of the data center 800 described with reference to FIG. 10 is merely illustrative and that other implementations can be utilized.

Figure 11:
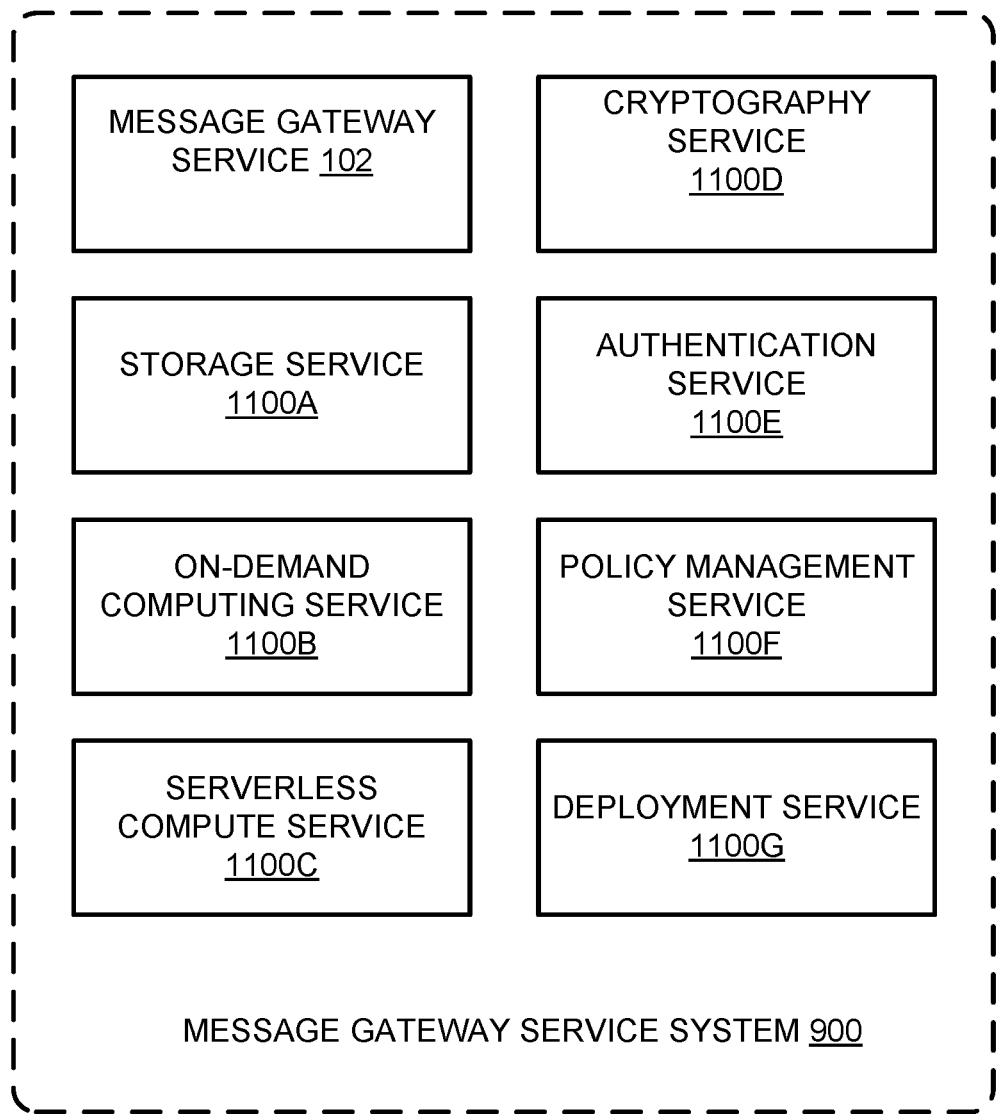
FIG. 11 is a network services diagram that shows aspects of several services that can be provided by and utilized within a system, or a larger system of which the system is a part, which is configured to implement the various technologies disclosed herein.

FIG. 11 is a network services diagram that shows aspects of several services that can be provided by and utilized within the message gateway services system 900, or a larger system of which the system is a part, which is configured to implement the various technologies disclosed herein. In particular, and as discussed above, the system, or a larger system of which the system is a part, can provide a variety of network services to users and other users including, but not limited to, the message gateway service 102 and/or the computing instance 106, a storage service 1100A, an on-demand computing service 1100B, a serverless compute service 1100C, a cryptography service 1100D, an authentication service 1100E, a policy management service 1100F, and a deployment service 1100G. The system, or a larger system of which the system is a part, can also provide other types of network services, some of which are described below.

It is also noted that not all configurations described include the network services shown in FIG. 11 and that additional network services can be provided in addition to, or as an alternative to, the services explicitly described herein. Each of the services shown in FIG. 11 can also expose web service interfaces that enable a caller to submit appropriately configured API calls to the various services through web service requests. The various web services can also expose GUIs, command line interfaces ("CLIs"), and/or other types of interfaces for accessing the functionality that they provide. In addition, each of the services can include service interfaces that enable the services to access each other. Additional details regarding some of the services shown in FIG. 11 will now be provided.

The storage service 1100A can be a network-based storage service that stores data obtained from users of the system, or a larger system of which the system is a part. The data stored by the storage service 1100A can be obtained from computing devices of users.

The on-demand computing service 1100B can be a collection of computing resources configured to instantiate VM instances and to provide other types of computing resources on demand. For example, a user of the system, or a larger system of which the system is a part, can interact with the on-demand computing service 1100B (via appropriately configured and authenticated API calls, for example) to provision and operate VM instances that are instantiated on physical computing devices hosted and operated by the system, or a larger system of which the system is a part. The VM instances can be used for various purposes, such as to operate as servers supporting the network services described herein, a web site, to operate business applications or, generally, to serve as computing resources for the user.

Other applications for the VM instances can be to support database applications, electronic commerce applications, business applications and/or other applications. Although the on-demand computing service 1100B is shown in FIG. 11, any other computer system or computer system service can be utilized in the system, or a larger system of which the system is a part, to implement the functionality disclosed herein, such as a computer system or computer system service that does not employ virtualization and instead provisions computing resources on dedicated or shared computers/servers and/or other physical devices.

The serverless compute service 1100C is a network service that allows users to execute code (which might be referred to herein as a "function") without provisioning or managing server computers in the system, or a larger system of which the system is a part. Rather, the serverless compute service 1100C can automatically run code in response to the occurrence of events. The code that is executed can be stored by the storage service 1100A or in another network accessible location.

In this regard, it is to be appreciated that the term "serverless compute service" as used herein is not intended to infer that servers are not utilized to execute the program code, but rather that the serverless compute service 1100C enables code to be executed without requiring a user to provision or manage server computers. The serverless compute service 1100C executes program code only when needed, and only utilizes the resources necessary to execute the code. In some configurations, the user or entity requesting execution of the code might be charged only for the amount of time required for each execution of their program code.

The system, or a larger system of which the system is a part, can also include a cryptography service 1100D. The cryptography service 1100D can utilize storage services of the system, or a larger system of which the system is a part, such as the storage service 1100A, to store encryption keys in encrypted form, whereby the keys can be usable to decrypt user keys accessible only to particular devices of the cryptography service 1100D. The cryptography service 1100D can also provide other types of functionality not specifically mentioned herein.

The system, or a larger system of which the system is a part, in various configurations, also includes an authentication service 1100E and a policy management service 1100F. The authentication service 1100E, in one example, is a computer system (i.e., collection of computing resources 1002) configured to perform operations involved in authentication of users or customers. For instance, one of the services shown in FIG. 11 can provide information from a user or customer to the authentication service 1100E to receive information in return that indicates whether or not the requests submitted by the user or the customer are authentic.

The policy management service 1100F, in one example, is a network service configured to manage policies on behalf of users or customers of the system, or a larger system of which the system is a part. The policy management service 1100F can include an interface (e.g. API or GUI) that enables customers to submit requests related to the management of policy, such as a security policy. Such requests can, for instance, be requests to add, delete, change or otherwise modify policy for a customer, service, or system, or for other administrative actions, such as providing an inventory of existing policies and the like.

The system, or a larger system of which the system is a part, can additionally maintain other network services based, at least in part, on the needs of its customers. For instance, the system, or a larger system of which the system is a part, can maintain a deployment service 1100G for deploying program code in some configurations. The deployment service 1100G provides functionality for deploying program code, such as to virtual or physical hosts provided by the on-demand computing service 1100B. Other services include, but are not limited to, database services, object-level archival data storage services, and services that manage, monitor, interact with, or support other services. The system, or a larger system of which the system is a part, can also be configured with other network services not specifically mentioned herein in other configurations.

Figure 12:
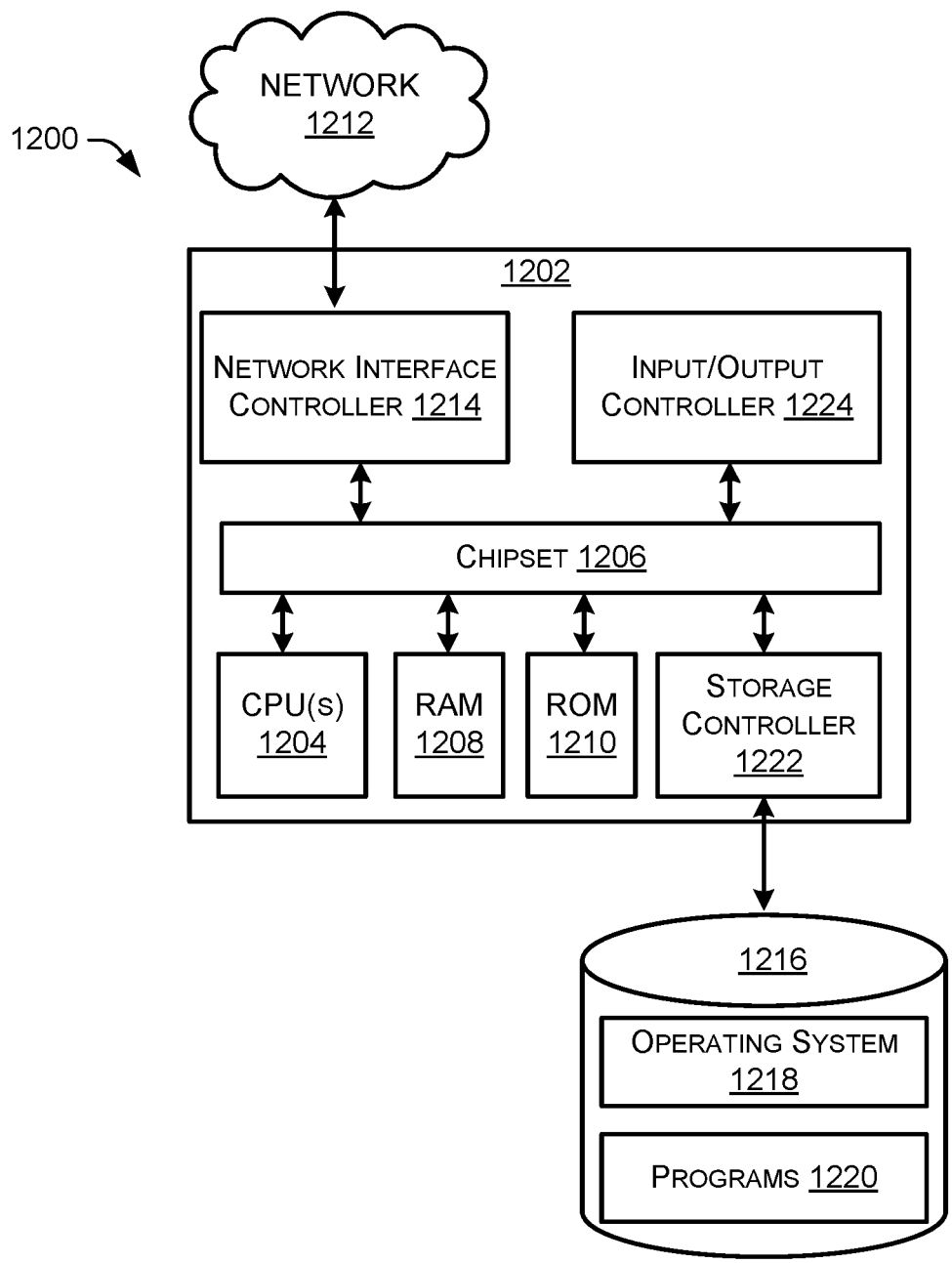
FIG. 12 is a computer architecture diagram showing an illustrative computer hardware architecture for implementing a computing device that can be utilized to implement aspects of the various technologies presented herein.

FIG. 12 shows an example computer architecture for a computer 1200 capable of executing program components for implementing the functionality described above. The computer architecture shown in FIG. 12 illustrates a conventional server computer, workstation, desktop computer, laptop, tablet, network appliance, e-reader, smartphone, or other computing device, and can be utilized to execute any of the software components presented herein. The computer 1200 may represent architecture for a naming service, a concentrator, a reader, and/or other devices described herein.

The computer 1200 includes a baseboard 1202, or "motherboard," which is a printed circuit board to which a multitude of components or devices can be connected by way of a system bus or other electrical communication paths. In one illustrative configuration, one or more central processing units ("CPUs") 1204 operate in conjunction with a chipset 1206. The CPUs 1204 can be standard programmable processors that perform arithmetic and logical operations necessary for the operation of the computer 1200.

The CPUs 1204 perform operations by transitioning from one discrete, physical state to the next through the manipulation of switching elements that differentiate between and change these states. Switching elements can generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 1206 provides an interface between the CPUs 1204 and the remainder of the components and devices on the baseboard 1202. The chipset 1206 can provide an interface to a RAM 1208, used as the main memory in the computer 1200. The chipset 1206 can further provide an interface to a computer-readable storage medium such as a read-only memory ("ROM") 1210 or non-volatile RAM ("NVRAM") for storing basic routines that help to startup the computer 1200 and to transfer information between the various components and devices. The ROM 1210 or NVRAM can also store other software components necessary for the operation of the computer 1200 in accordance with the configurations described herein.

The computer 1200 can operate in a networked environment using logical connections to remote computing devices and computer systems through a network, such as the network 1212. The chipset 1206 can include functionality for providing network connectivity through a NIC 1214, such as a gigabit Ethernet adapter. The NIC 1214 is capable of connecting the computer 1200 to other computing devices over the network 1212. It should be appreciated that multiple NICs 1214 can be present in the computer 1200, connecting the computer to other types of networks and remote computer systems.

The computer 1200 can be connected to a mass storage device 1216 that provides non-volatile storage for the computer. The mass storage device 1216 can store an operating system 1218, programs 1220, and data, which have been described in greater detail herein. The mass storage device 1216 can be connected to the computer 1200 through a storage controller 1222 connected to the chipset 1206. The mass storage device 1216 can consist of one or more physical storage units. The storage controller 1222 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 1200 can store data on the mass storage device 1216 by transforming the physical state of the physical storage units to reflect the information being stored. The specific transformation of physical state can depend on various factors, in different implementations of this description. Examples of such factors can include, but are not limited to, the technology used to implement the physical storage units, whether the mass storage device 1216 is characterized as primary or secondary storage, and the like.

For example, the computer 1200 can store information to the mass storage device 1216 by issuing instructions through the storage controller 1222 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 1200 can further read information from the mass storage device 1216 by detecting the physical states or characteristics of one or more particular locations within the physical storage units.

In addition to the mass storage device 1216 described above, the computer 1200 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 1200.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the mass storage device 1216 can store an operating system 1218 utilized to control the operation of the computer 1200. According to one configuration, the operating system comprises the LINUX operating system or one of its variants such as, but not limited to, UBUNTU, DEBIAN, and CENTOS. According to another configuration, the operating system comprises the WINDOWS SERVER operating system from MICROSOFT Corporation. According to further configurations, the operating system can comprise the UNIX operating system or one of its variants. It should be appreciated that other operating systems can also be utilized. The mass storage device 1216 can store other system or application programs and data utilized by the computer 1200.

In one configuration, the mass storage device 1216 or other computer-readable storage media is encoded with computer-executable instructions which, when loaded into the computer 1200, transform the computer from a general-purpose computing system into a special-purpose computer capable of implementing the configurations described herein. These computer-executable instructions transform the computer 1200 by specifying how the CPUs 1204 transition between states, as described above. According to one configuration, the computer 1200 has access to computer-readable storage media storing computer-executable instructions which, when executed by the computer 1200, perform the various processes described above. The computer 1200 can also include computer-readable storage media for performing any of the other computer-implemented operations described herein.

The computer 1200 can also include one or more input/output controllers 1224 for receiving and processing input from a number of input devices, such as a keyboard, a mouse, a touchpad, a touch screen, an electronic stylus, or other type of input device. Similarly, an input/output controller 1224 can provide output to a display, such as a computer monitor, a flat-panel display, a digital projector, a printer, or other type of output device. It will be appreciated that the computer 1200 might not include all of the components shown in FIG. 12, can include other components that are not explicitly shown in FIG. 12, or can utilize an architecture completely different than that shown in FIG. 12.

Based on the foregoing, it should be appreciated that technologies for providing a network service capable of identifying infrequently accessed data from a request stream have been disclosed herein. Moreover, although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and media are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes can be made to the subject matter described herein without following the example configurations and applications illustrated and described, and without departing from the true spirit and scope of the present invention, which is set forth in the following claims.

What is claimed is:

1. One or more non-transitory computer-readable media storing executable instructions that, when, executed, cause one or more computing devices to perform acts comprising:
    receiving a request from a client device to create a first secure channel between the client device and a message gateway service, the client device being a first type of device that requests data stored in association with one or more computing instances, at least one computing instance of the one or more computing instances being a virtual machine;
    authorizing the client device in response to analyzing the request using an access manager;
    creating the first secure channel between the client device and the message gateway service;
    sending a message to an agent of a computing instance of the one or more computing instances to open a second secure channel between the message gateway service and the computing instance, wherein the first secure channel and the second secure channel form a secure communication tunnel, the computing instance associated with a second type of device that is different than the first type of device and the computing instance maintained by a service provider network that is configured to provide the data to the client device;
    storing control plane information associated with client connectivity of the client device with at least one of the message gateway service or the computing instance;
    receiving, via the first secure channel, a command for execution by the computing instance;
    determining, based on privileges associated with a user account, that the command is authorized for use in association with the user account;
    storing the command and first metadata about the command in a log;
    sending the command to the computing instance via the second secure channel;
    receiving, via the second secure channel, an output from the computing instance in response to the command;
    storing the output and second metadata about the output in the log;
    storing, in the log, an association between at least one of the command and the output or the first metadata and the second metadata; and
    sending the output through the first secure channel to the client device.

2. The one or more non-transitory computer-readable media as recited in claim 1, wherein the acts further comprise:
    receiving, via the first secure channel, a different command for execution by the computing instance;
    determining, based at least in part on information from the access manager that the client device lacks a privilege to perform the different command; and
    refraining from sending the different command to the computing instance.

3. The one or more non-transitory computer-readable media as recited in claim 1, wherein the acts further comprise:
    decrypting the command before transporting the command to the computing instance via the second secure channel; and
    encrypting the output from the computing instance before transporting the output to the client device via the first secure channel.

4. The one or more non-transitory computer-readable media as recited in claim 1, wherein the acts further comprise outputting at least some log information from the log to an administrator device that is different than the client device, the log information including at least the command and the output.

5. A computer-implemented method to create a secure communication tunnel between a client device and a computing instance, the method comprising:
    receiving a request from a client device to create a first secure channel between the client device and a message gateway service, the client device being a first type of device;
    authorizing the client device in response to analyzing the request using an access manager;
    creating the first secure channel between the client device and a message gateway service;
    sending a message to a computing instance to open a second secure channel between the message gateway service and the computing instance, wherein the first secure channel and the second secure channel form the secure communication tunnel and the computing instance is associated with a second type of device that is different than the first type of device;
    receiving, via the first secure channel, a command for execution by the computing instance;
    sending the command to the computing instance via the second secure channel;
    receiving, via the second secure channel, an output from the computing instance in response to the command;
    storing, in a log, an association between the command and the output; and sending the output through the first secure channel to the client device.

6. The computer-implemented method as recited in claim 5, further comprising:
storing control plane information associated with client connectivity of the client device with at least one of the message gateway service or the computing instance.

7. The computer-implemented method as recited in claim 6, further comprising outputting at least some log information from the log to an administrator device that is different than the client device.

8. The computer-implemented method as recited in claim 5, further comprising:
receiving, via the first secure channel, a different command for execution by the computing instance;
determining, based at least in part on information from the access manager that the client device lacks a privilege to perform the different command; and
refraining from sending the different command to the computing instance.

9. The computer-implemented method as recited in claim 5, wherein the command is received from at least one of a command-line interface or from a browser-based interactive shell via the client device.

10. The computer-implemented method as recited in claim 5, wherein the first secure channel includes at least an open web-socket connection with a uniform resource locator (URL), a channel token, and a session identifier.

11. The computer-implemented method as recited in claim 5, further comprising transmitting a channel token and a session identifier to the client device to establish the first secure channel.

12. The computer-implemented method as recited in claim 5, further comprising:
receiving, via the first secure channel, an end-session command; and
terminating at least the second secure connection.

13. The computer-implemented method as recited in claim 5, further comprising decrypting the command before transporting the command to the computing instance via the second secure channel.

14. The computer-implemented method as recited in claim 5, further comprising encrypting the output from the computing instance before transporting the output to the client device via the first secure channel.

15. The computer-implemented method as recited in claim 5, wherein the computing instance is implemented as at least one of a Windows instance or a Linux instance.

16. A system comprising:
one or more processors; and
memory to store computer-executable instructions that, when executed, cause the one or more processors to perform acts to:
receive a request from a client device to create a first secure channel between the client device and a message gateway service, the client device being a first type of device;
create the first secure channel between the client device and a message gateway service;
send a message to an agent of a computing instance to open a second secure channel between the message gateway service and the computing instance, wherein the first secure channel and the second secure channel form a secure communication tunnel and the computing instance is associated with a second type of device that is different than the first type of device, the second type of device being at least one of a virtual machine or an instance of a remote machine;
receive, via the first secure channel, a command for execution by the computing instance;
determine, based at least in part on information from an access manager whether the client device includes a privilege to perform the command;
when the client device lacks the privilege to perform the command, refrain from sending the different command to the computing instance; and
when the client device includes the privilege to perform the command:
send the command to the computing instance via the second secure channel;
receive, via the second secure channel, an output from the computing instance in response to the command; and
send the output through the first secure channel to the client device.

17. The system as recited in claim 16, wherein the computer-executable instructions, when executed, cause the one or more processors to further perform acts to:
store at least the command in a log; and
when the client device includes the privilege to perform the command, store at least the output in the log.

18. The system as recited in claim 16, wherein the computer-executable instructions, when executed, cause the one or more processors to further perform acts to:
decrypt the command prior to sending the command to the computing instance; and
when the client device includes the privilege to perform the command, encrypt the output prior to sending the output to the client device.

19. The system as recited in claim 16, wherein the computer-executable instructions, when executed, cause the one or more processors to further perform acts to authorize the client device in response to analyzing the request using an access manager.

20. The system as recited in claim 16, wherein the computer-executable instructions, when executed, cause the one or more processors to further perform acts to:
receive a command to terminate the secure communication tunnel; and
terminate at least the second secure connection.

21. A computer-implemented method to create a secure communication tunnel between a client device and a computing instance, the method comprising:
receiving, by an agent of the computing instance, a request from a message service gateway to open a first secure channel between the message gateway service and the computing instance, wherein the message gateway service includes a second secure channel between the message gateway service and the client device, wherein the first secure channel and the second secure channel form the secure communication tunnel configured to facilitate communications between the client device and the computing instance via the message service gateway, and wherein the client device is a first type of device and the computing instance is associated with a second type of device that is different than the first type of device;
authorizing the client device based at least in part on the request;
receiving, via the second secure channel and from the message service gateway, a command originated by the client device and for execution by the computing instance;

determining that the client device is associated with a privilege to perform the command;

generating, by the computing instance and based at least in part on the client device being associated with the privilege to perform the command, an output in response to the request;

storing, in a log, the command, the output, and an association between the command and the output; and sending, via the first secure channel and to the message service gateway, the output for delivery to the client device.

\* \* \* \* \*